US009738217B1

United States Patent
Bradley et al.

(10) Patent No.: US 9,738,217 B1
(45) Date of Patent: Aug. 22, 2017

(54) MODULAR VEHICLE LIGHT

(71) Applicant: Whelen Engineering Company, Inc., Chester, CT (US)

(72) Inventors: Lauren Bradley, Rockfall, CT (US); David J. Sousa, Ivoryton, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 255 days.

(21) Appl. No.: 14/516,613

(22) Filed: Oct. 17, 2014

(51) Int. Cl.
| | |
|---|---|
| *F21V 7/00* | (2006.01) |
| *B60Q 1/32* | (2006.01) |
| *B60Q 1/26* | (2006.01) |
| *F21S 8/10* | (2006.01) |
| *F21Y 103/00* | (2016.01) |

(52) U.S. Cl.
CPC ........... *B60Q 1/323* (2013.01); *B60Q 1/2696* (2013.01); *F21S 48/24* (2013.01); *F21Y 2103/003* (2013.01)

(58) Field of Classification Search
CPC .................................................. B60Q 1/2696
See application file for complete search history.

(56) References Cited

U.S. PATENT DOCUMENTS

| | | | |
|---|---|---|---|
| 8,480,253 B1 | 7/2013 | Baker et al. | |
| 2008/0298058 A1* | 12/2008 | Kan | F21V 15/01 362/240 |
| 2010/0172135 A1* | 7/2010 | Holder | F21K 9/00 362/249.14 |
| 2012/0300441 A1* | 11/2012 | Thomas | F21V 15/013 362/184 |
| 2013/0272012 A1* | 10/2013 | Thibodeau | F21V 15/01 362/546 |
| 2014/0168967 A1* | 6/2014 | Itami | F21V 21/15 362/233 |

* cited by examiner

*Primary Examiner* — Evan Dzierzynski
(74) *Attorney, Agent, or Firm* — Alix, Yale & Ristas, LLP (57) ABSTRACT

A modular vehicle light comprises multiple elongated modules which are disposed in end-to-end relationship. The modules are mechanically joined and electrically connected in series. The modules are preferably substantially identical. Each module contains a power board with a microprocessor and a buffer. The microprocessor transmits signals to a matrix of LEDs. The LEDs emit light which transverses an optical assembly to form a narrow band of illumination. In one embodiment, a linear matrix of 36 LEDs comprising 3 color groups of LEDs is employed. Fasteners captured in a bracket at the rear of the module fasten the vehicle light to the vehicle.

20 Claims, 13 Drawing Sheets

MODULAR VEHICLE LIGHT

BACKGROUND

This disclosure relates generally to lights which are installed on vehicles. More particularly, this disclosure relates to auxiliary vehicle lights which employ LEDs to provide illumination.

Auxiliary light assemblies which are employed for vehicles generally must employ low power illumination sources, such as LEDs, and be relatively easy to install onto the vehicle to connect with the vehicle power supply. For many vehicle locations, a significant issue for vehicle lights is to ensure protection from the environment, including corrosive and invasive road materials, and especially moisture. The latter is especially critical at lower vehicle locations such as, for example, the vicinity of running boards. Because vehicles which have a running board present a very wide variety of headroom constraints, it is highly advantageous if a running board light assembly has a modularity which accommodates a wide range of vehicle makes and models.

SUMMARY

Briefly stated, a modular vehicle light, in a preferred form, is adapted for mounting to or in the vicinity of a vehicle running board. A module for the vehicle light comprises a first shell having longitudinally spaced ends and a second shell substantially identical to the first shell. The first and second shells are joined to define a housing front and a rear and a longitudinal channel. A power board is disposed in the housing and is electrically connectable through an end. Longitudinally spaced LEDs communicate with the power board and form a linear LED matrix. An elongated integrated optical assembly in optical communication with the LEDs functions to transmit illumination from the front of the module. A bracket is received in the channel and defines a longitudinal retaining slot which is accessible at the rear of the module.

The ends of the first and second shells define circular openings. A grommet is received in at least one of the openings. The optical assembly comprises an elongated concave reflector and a central refractor. The LEDs preferably comprise at least two groups with different emission frequencies. In one embodiment, the matrix of LEDs consists of three groups of LEDs, each group having a different emission frequency. The LEDs may emit at a single frequency or color.

The first shell has a pair of anchoring bosses which are alignable with a corresponding boss of the second shell. A fastener connects the bosses to secure together the shells. In one embodiment, the bracket defines a T-shaped slot. The power board is centrally located in the housing and is at least partially encased in potting material. A controller remote from the housing communicates with the power board via a cord through an end of the housing.

The modular vehicle light preferably comprises plurality of elongated light modules disposed and connected in a linear end-to-end relationship. Each of the modules comprises an elongated housing having a front and a rear having a longitudinal channel and defining a longitudinal slot, and a pair of opposed ends. A power board in each module is electrically connectable through each module longitudinal end to adjacent modules or vehicle power and control inputs. A matrix of longitudinally spaced LEDs are arranged on an LED board, which receives electrical power from the power board to illuminate the LEDs. The LED board may also be described as a "display board" and may include one, two or three colors of LEDs. An elongated integrated optical assembly is a molded plastic component defining a shallow trough configured to receive the LED display board and the power board. The integrated optical assembly includes an elongated beam-forming optic in optical communication with the LEDs. The beam-forming optic projects LED light in the form of a wide-angle, vertically collimated beam from the slot defined at the "front" of the mated shells of each module. An elongated bracket is received in the channel at the "rear" of the mated shells, spanning and connecting the modules to each other. In one embodiment, the bracket defines a longitudinal slot having a substantially T-shape configured to receive the head of a fastener to secure the modular light to a vehicle.

In the disclosed embodiment, the beam forming optic is integrally molded with the integrated optical assembly. The beam forming optic is of the internal reflecting type and includes an elongated concave internal reflecting surface (reflector), elongated centrally disposed refracting surfaces and a forward facing light emission surface from which the wide angle, vertically collimated beam is projected. Each longitudinal end of the beam-forming optic is defined by the refracting and reflecting surfaces rotated about the optical axis of the last LED in the array. The array of LEDs may be a single color, two colors or three colors and may include LEDs emitting white light.

A modular vehicle light assembly comprises a controller and a plurality of elongated light modules disposed and connected in a linear end-to-end relationship. Each module comprises a housing having a front and a rear and having a channel and a pair of opposed ends. A power board is disposed in the housing and has a microprocessor which generates command signals. The power board is electrically connectable through an end of the module for communication with the controller. A matrix of longitudinally spaced LEDs is powered by the power board and responsive to the command signals. An optical assembly in optical communication with the LEDs generates a band of illumination projected from the front of the module. A bracket is received in each of the channels to connect the modules to each other.

Each of the power boards is connected in series. The controller and the modules connect via a four-conductor line. The controller connects via a four-pin connection disposed at one end of a module or series of up to six modules. Each power board has a buffer which communicates with the controller and the microprocessor. Data is transmitted from the controller in a serial format in twelve-byte packets comprising two-byte segments. Each buffer is filled with two-byte segments of data on a "first in first out" basis and the remaining segments of data are transmitted to succeeding modules. Each of the two-byte segments includes information regarding the flash pattern, color, phase and intensity of light emitted by the LEDs.

DETAILED DESCRIPTION

Figure 1:
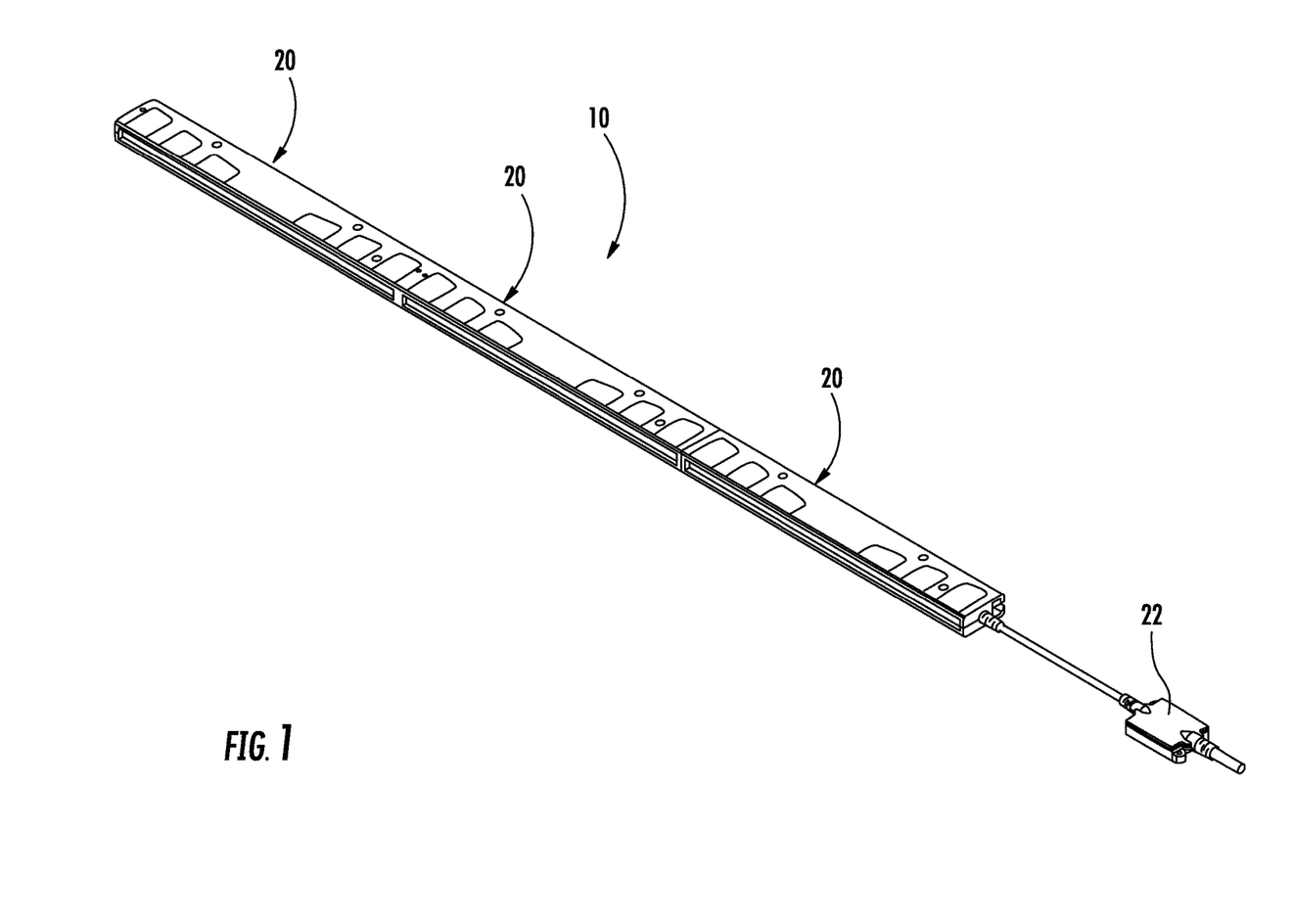
FIG. 1 is a perspective view of a modular vehicle light together with a cord and a controller.

With reference to the drawings wherein like numeral represent like parts throughout the several figures, a modular vehicle light is generally designated by the numeral 10 in FIG. 1. The modular vehicle light 10 is especially adapted for mounting in the vicinity of a running board (not illustrated) of a vehicle, although other mounting locations and applications are possible. The modular vehicle light 10 is constructed to withstand harsh environmental conditions typical at a lower vehicle location, is configured to provide a wide range of lengths to accommodate numerous vehicle formats and types, and is designed to facilitate an efficient installation on the vehicle and integration with the vehicle power supply by, inter alia, employing a unidirectional power and communication connection at one end of the light assembly.

The modular light assembly 10 is comprised of a linear series of modules 20 which are mechanically connected and electrically connected in series/daisy-chain fashion for a given vehicle and function. In one preferred embodiment, each module 20 is approximately 12 inches in length. Upon installation to the vehicle, each module 20 of the modular vehicle light 10 is capable of generating a horizontally oriented, wide angle, vertically collimated band of illumination in selected colors, patterns, phases and intensities that is projected away from the vehicle. The illumination from the modular vehicle light 10 can be used for a warning signal, perimeter lighting with white light, or vehicle identification "cruise" lights at low power. While warning light signals are typically flashing light signals, illumination and cruise light signals are typically steady "on" patterns.

Figure 3:
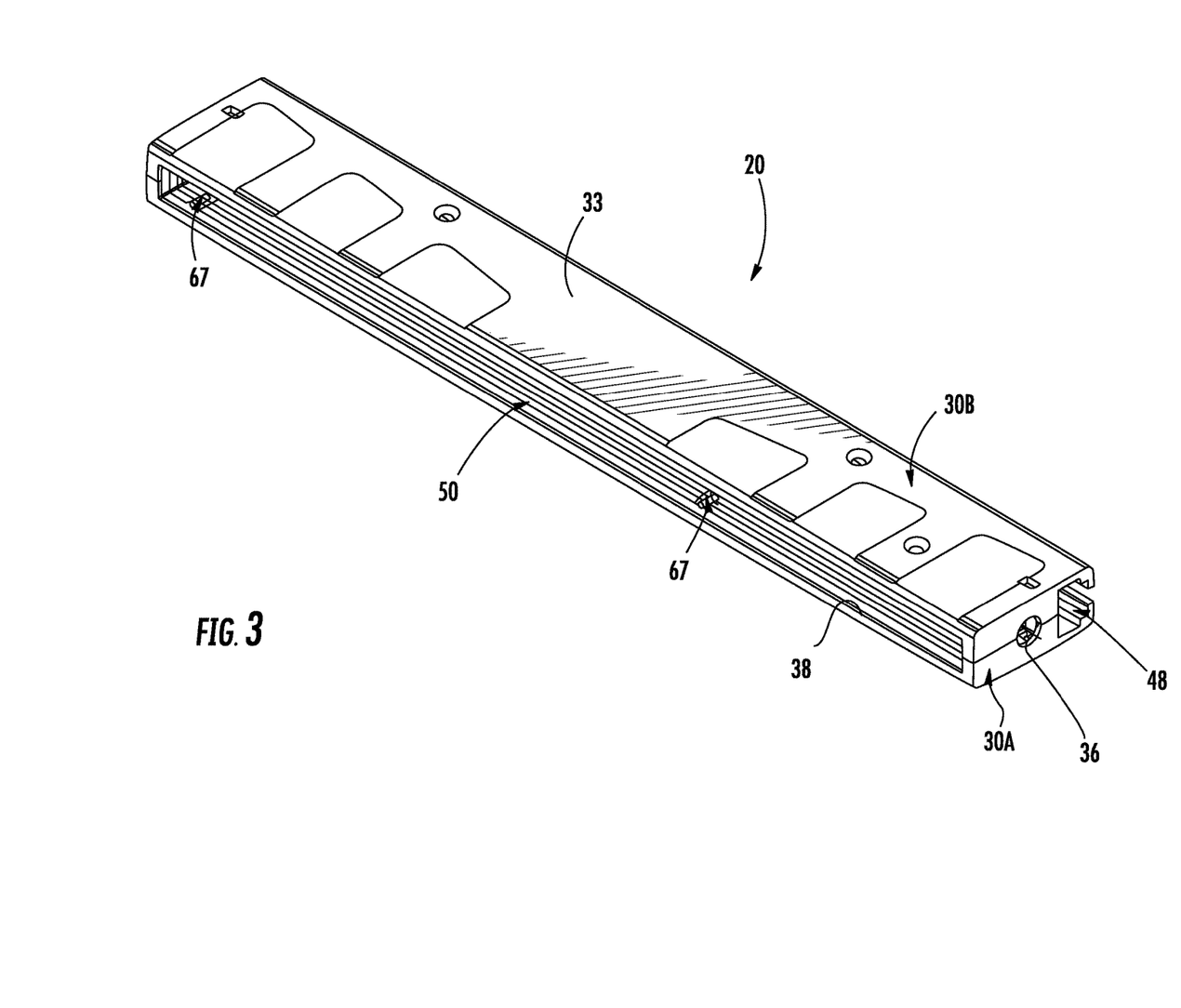
FIG. 3 is a generally frontal perspective view of a module for the vehicle light of FIG. 1 with portions removed.
Figure 4:
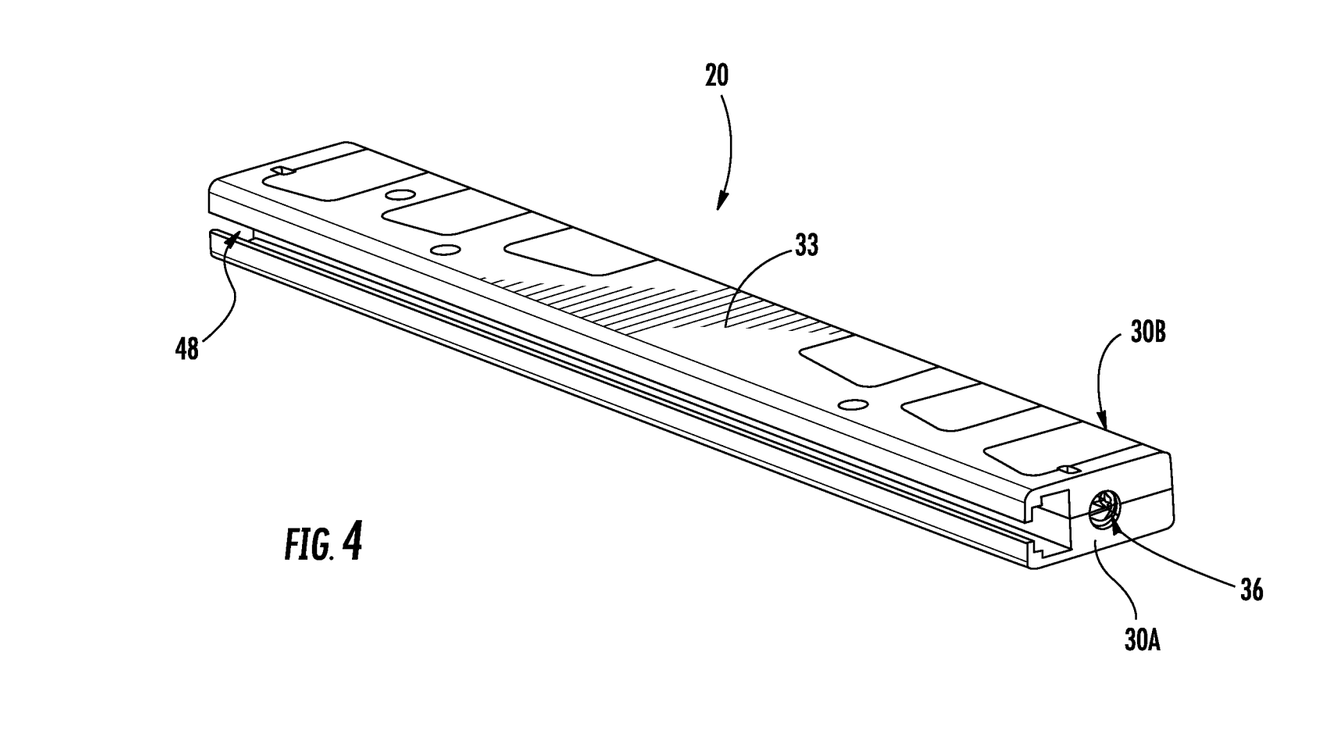
FIG. 4 is a generally rear perspective view of the module of FIG. 3 with portions removed.
Figure 5:
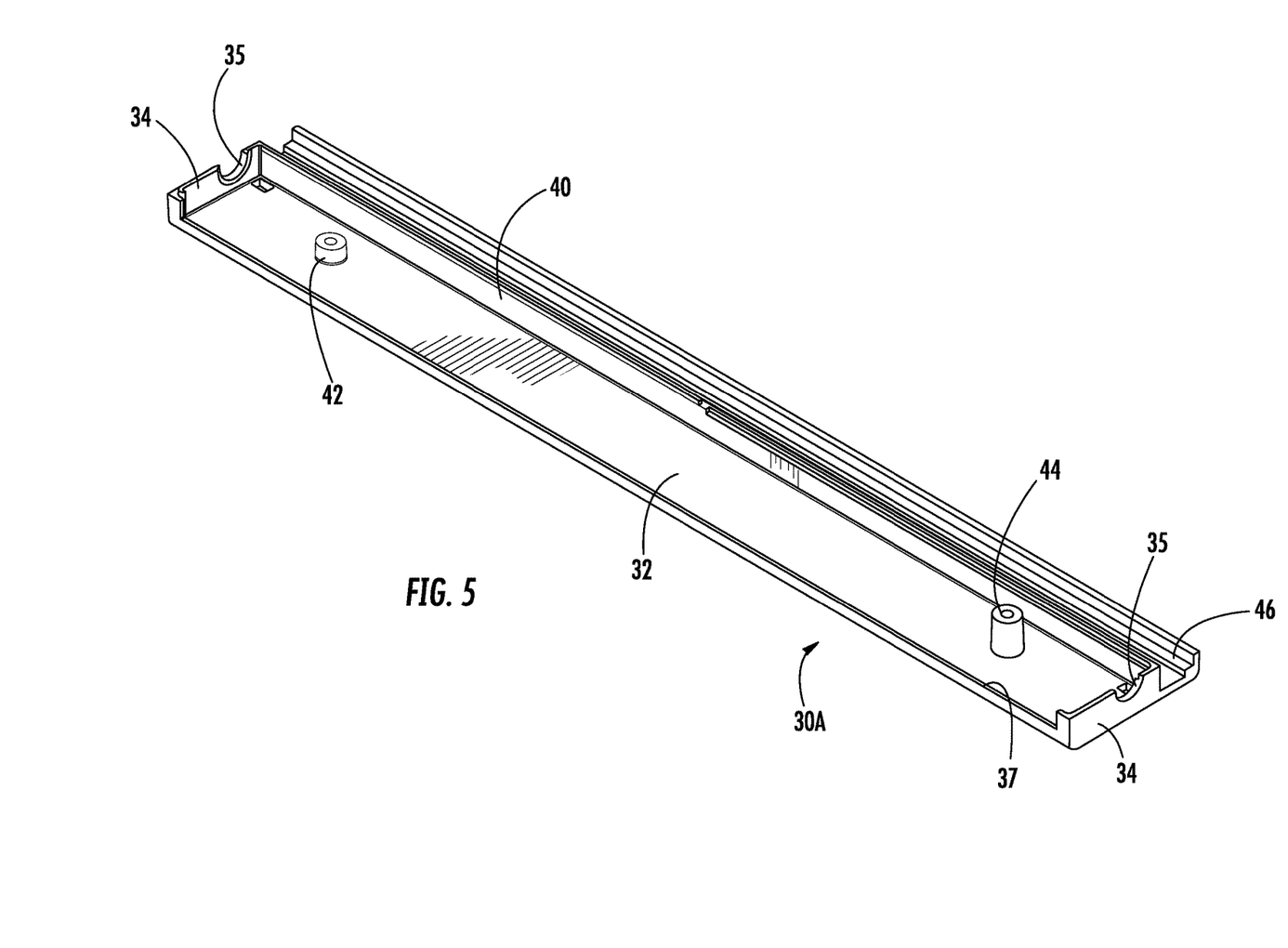
FIG. 5 is an interior perspective view of a housing shell component for the module of FIG. 3.
Figure 13:
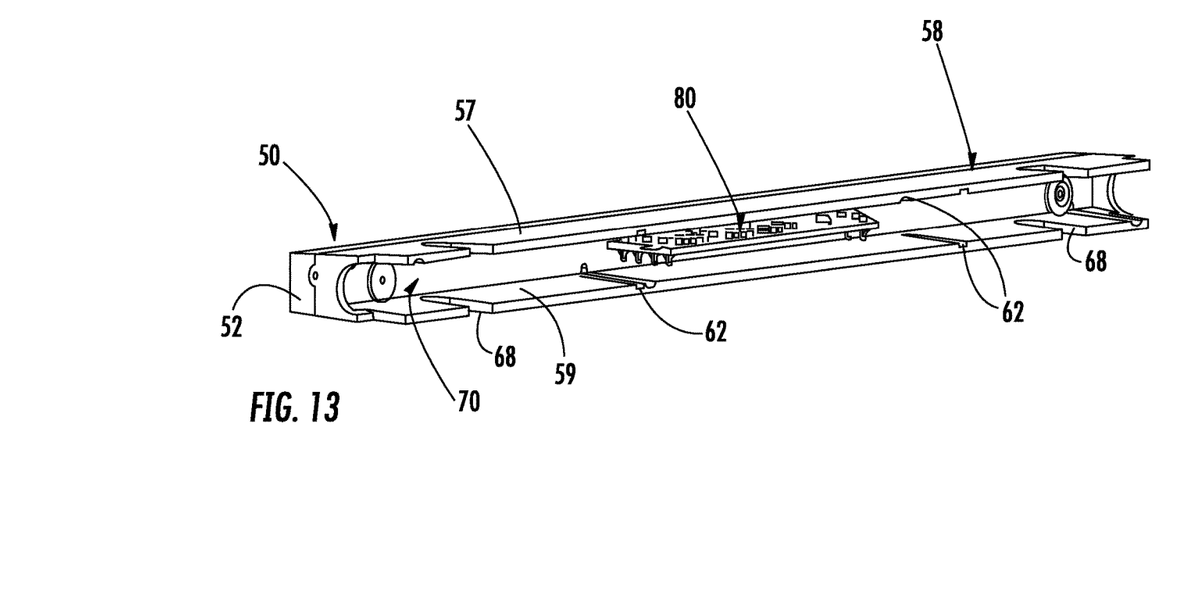
FIG. 13 is a generally rearward perspective view of the integrated optical assembly and various associated components for the optical assembly of FIG. 11.

Each module 20 is preferably substantially identical and includes as principal components: a pair of substantially identical housing shells 30A, 30B (FIGS. 3 and 4) which form the lower and upper housing, respectively; an integrated optical assembly 50 (FIGS. 5, 7 and 11) which extends longitudinally at the front portion of the module; an LED assembly 70 (FIG. 9) which comprises a linear matrix of LEDs; a power board 80 (FIGS. 9 and 13) for controlling and energizing the LEDs; and a longitudinally extending connecting/mounting bracket 100 (FIGS. 14 and 15) disposed at the rear of the module 20 and extending between modules. The connecting/mounting bracket 100 functions as the principal structure for mechanically connecting adjacent modules and mounting the modular light to a vehicle or other structure.

Figure 2:
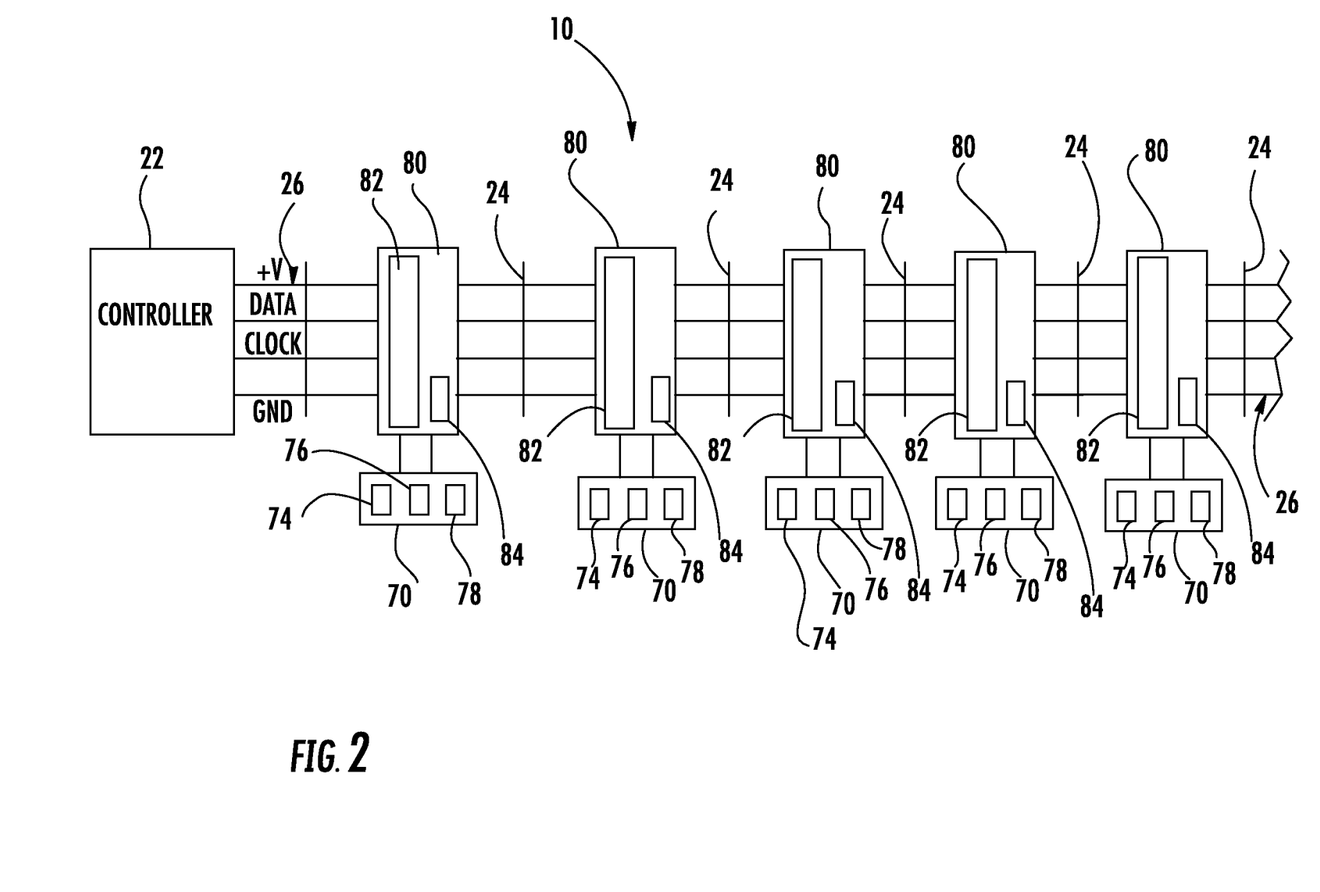
FIG. 2 is a representative schematic block diagram for the modular vehicle light and controller of FIG. 1.
Figure 9:
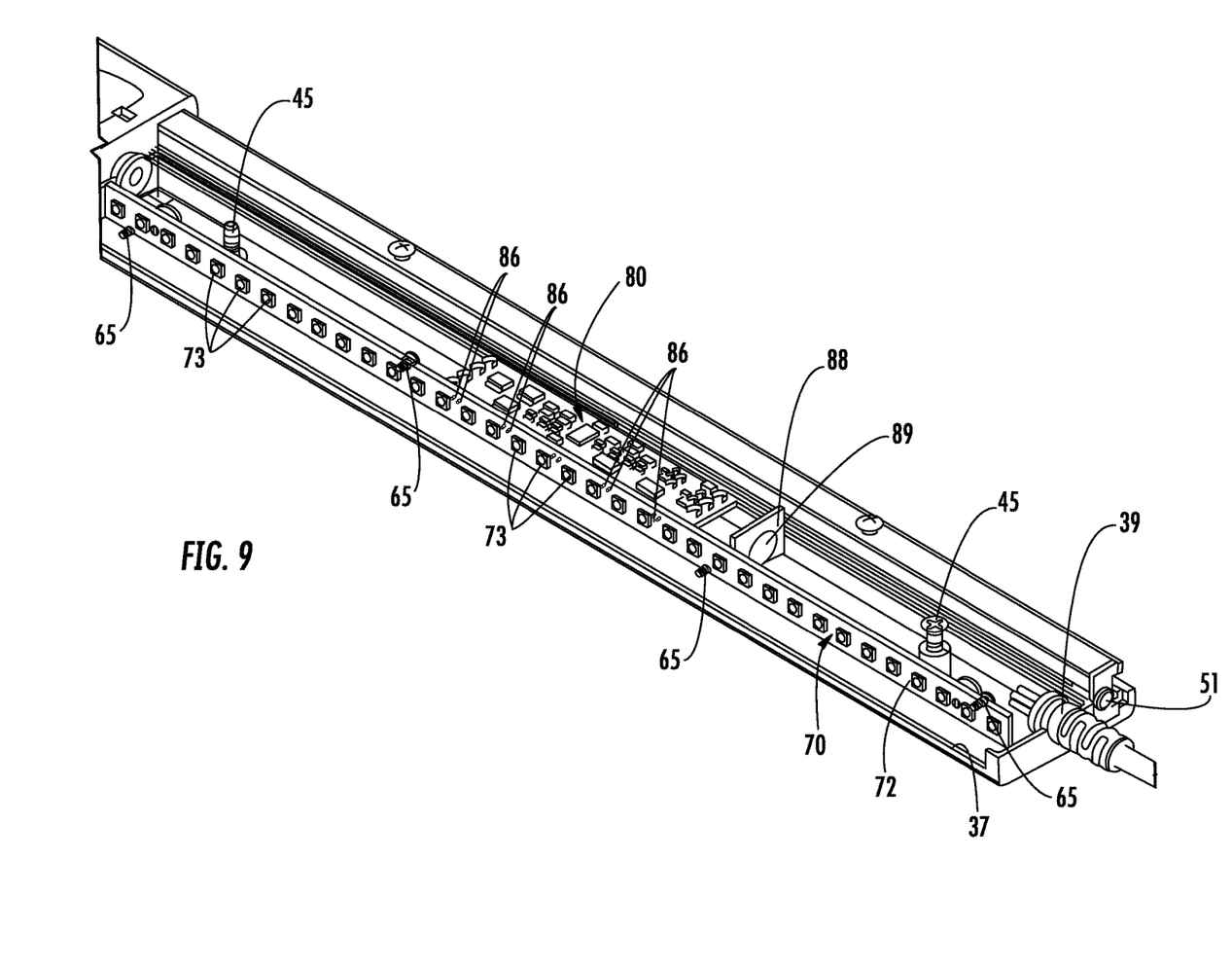
FIG. 9 is a fragmentary enlarged interior perspective view, portions removed, of the modular vehicle light and cord of FIG. 1.

With reference to FIGS. 2 and 9, the LED assembly 70 comprises an elongated PC board 72 to which LEDs 73 are secured and provided with electrical connections. The LEDs 73 may be of a single color, two colors or three colors. In the disclosed embodiment, one set of 12 LEDs can be illuminated at a time, with the two color LED boards having 24 LEDs and the three color LED board having 36 LEDs. LEDs for three different frequency emissions (red, yellow and blue) are designated as 74, 76 and 78, respectively (FIG. 2). Other colors and white LEDs may also be employed. Some illumination patterns will be flashing warning light patterns, while other patterns may be illumination patterns where white LEDs are energized to illuminate the area adjacent the front of the modules 20. Steady on, low power illumination patterns may be used as identification or "cruise" lights. One possible configuration is a three color arrangement with red and blue LEDs used for warning signals and cruise lighting, and white LEDs for illumination.

The power board 80 includes a communication interface comprising a buffer 82 for receiving instructions from an external controller 22. The power board 80 has a microprocessor 84 including memory for storing flash patterns, and power transistors arranged as current sources to deliver power to selected LEDs. The power board 80 includes five, two-pin connectors 86 that extend through the LED board 72 as best shown in FIG. 9. In a three color LED board, three of the two-pin connectors 86 are dedicated to providing power, one two pin connector providing power for each color of LED. Each power board 80 includes locations for four conductors to be connected at each end.

In the disclosed embodiments, the modules 20 are connected to each other by water resistant four-pin connectors 24. The modules 20 are arranged in series, with four conductors 26 extending from the controller 22 through all the power boards 80. The disclosed embodiments are configured to permit up to six modules, each with an associated power board 80 and up to three colors of LEDs to be driven from a single controller 22. The disclosed communication and control scheme reduces the number of waterproof connectors and conductors necessary to electrically connect the modules to each other and the vehicle power system. Further, the modules 20 are interchangeable and do not need to be addressable, which reduces the number of parts to be stocked and simplifies assembly or repair.

Each of the four conductors 26 is dedicated to a different function. Two of the conductors 26 are power and ground, a third conductor is a serial data line and the fourth conductor carries a clock signal (FIG. 2). In the disclosed embodiment, data is sent in serial format on the data line from the controller 22 in 12 byte packets. Each power board 80 is provided with a two-byte buffer 82 and the power boards are programmed to fill the buffer on a "first in first out basis" with the last two-bytes of data and send the remaining bytes along to the next module, where two-bytes fill the buffer and so forth until all the modules have received two-bytes of data. Each two-byte segment of data includes information regarding the flash pattern, color, phase, and intensity of the light signal to be emitted by the LED board of that module. Each power board 80 includes a microprocessor 84, such as a Renesis R8C/19, with on board memory programmed to read the data out of the buffer and activate the LEDs 73 accordingly. In an exemplary start up procedure, power and ground are applied to the conductors 26, and data is sent along the data line, filling the buffers 82 of each power board 80. The modules are programmed to wait a pre-determined time after receiving data to start the specified flash pattern. The flash patterns (including non-flash patterns for illumination and cruise functions) themselves and the program necessary to generate the flash pattern reside in the on board memory of the power board microprocessors 84. Accordingly, the amount of data transmitted from the controller 22 is very limited. The microprocessor 84 of each power board is programmed to start at the same pre-determined time following receipt of the data, as determined by the common clock signal. All the modules use the same clock signal, which allows the flash activity to be coordinated along the length of the modular light. The four conductors 26 are terminated by a cap on the water resistant connector 24 of the last module of the modular light.

With reference to FIGS. 3-6C, the shells 30A and 30B are rugged plastic molded members which engage and interlock to essentially form the housing for the vehicle light. Because the components are preferably substantially identical, each will be described in terms of the shell 30A. Where required for context, the corresponding components are designated with the same numeral and the letter B on the shell 30B. Shell 30A includes an elongated rectangular panel 32 which extends between opposed end panels 34. In one embodiment, the interior surface of panel 32 is slightly inclined from the front toward the rear. Each end panel 34 has a semi-circular slot 35. The panel 32 has various fastener openings and a shallow tiered exterior surface 33. Upon assembly, the slots 35 define a circular opening 36 in each module end. The elongated frontal side of the shell 30A includes an elongated shallow recess 37 which, upon assembly with the shell 30B, defines a frontal window 38 for the lens assembly. The shell 30A also includes an elongated rearward panel 40. A truncated boss 42 and a longitudinally spaced enlarged boss 44 protrude inwardly from the panel 32 and abut with the opposite bosses of shell 30B (FIG. 6C) to provide anchoring structures for receiving screws 45 (FIG. 9) to fasten the shells together.

Figure 7:
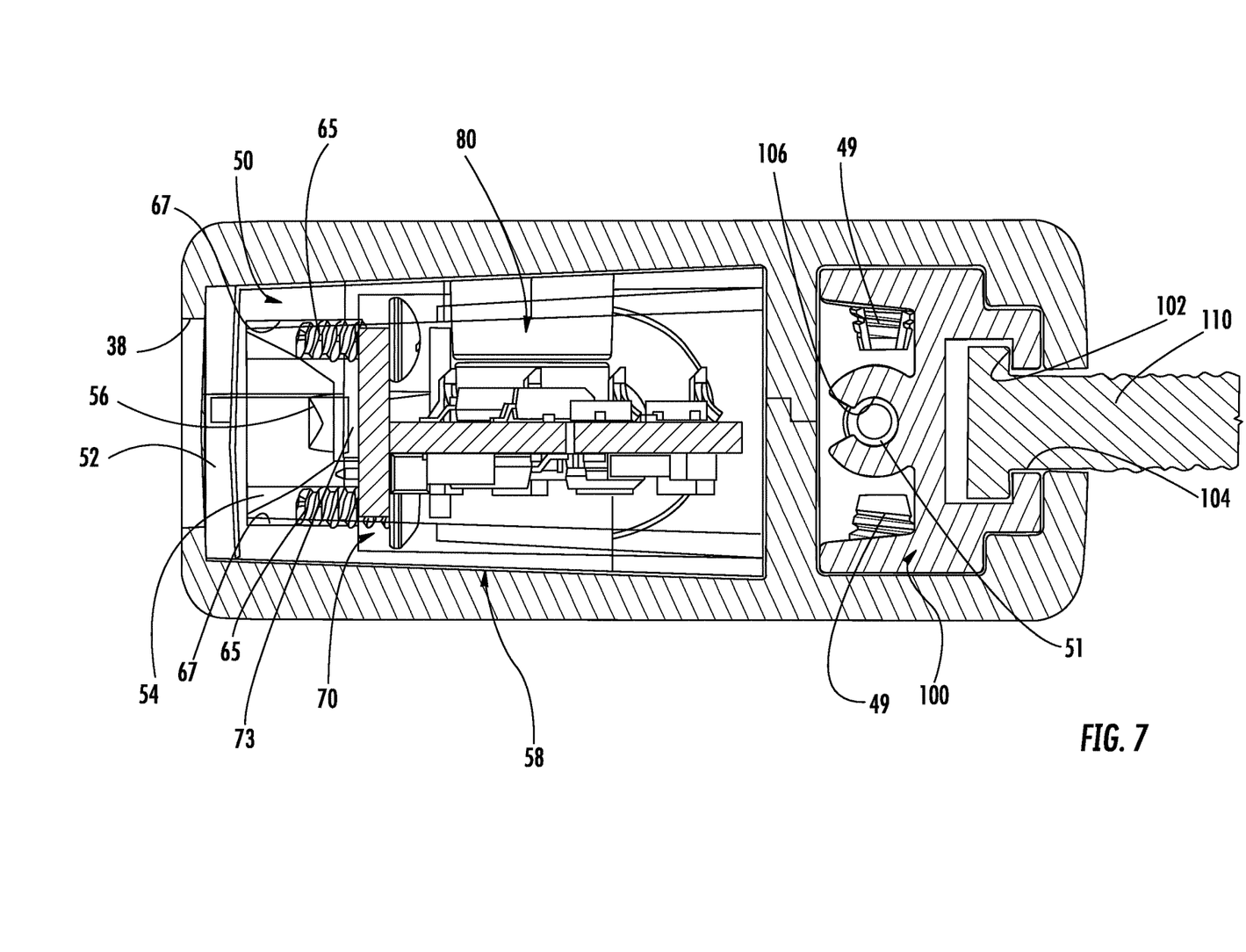
FIG. 7 is an enlarged interior sectional view, portions removed, of the modular vehicle light of FIG. 1.

The rear portion of each shell has an inverse stepped structure 46 which, upon assembly, defines a longitudinal channel 48 having a substantially uniform cross-section. The elongated connecting/mounting spine-like bracket 100 has an exterior stepped shape generally complementary to the channel and is closely received in the channel (FIG. 7). Screws 49 extend through the shells 30A and 30B into the bracket 100 to provide an integrated linear series of modules 20.

Figure 6A:
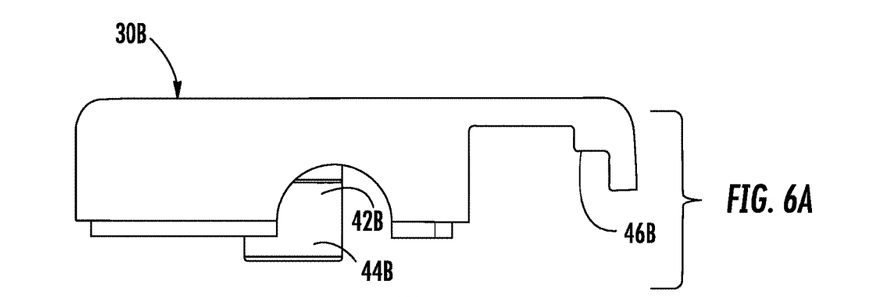
FIGS. 6A-6C are enlarged end views of housing shell components of the upper shell, the lower shell and the assembled shells, respectively, for the module of FIG. 3.
Figures 6B, 6C:
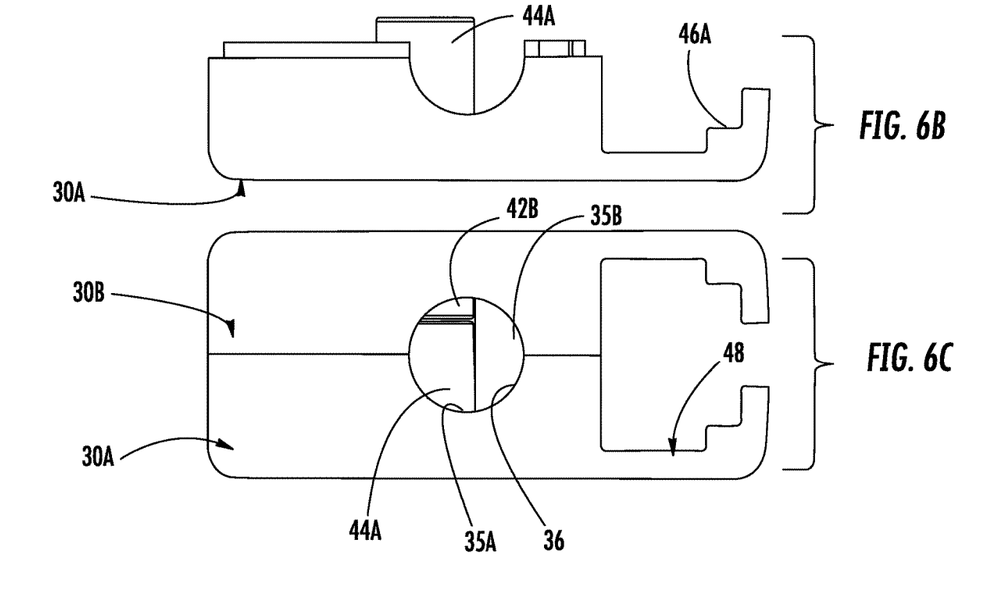

With respect to the end view of FIG. 6C, the shells are longitudinally and transversely aligned so that the boss 44A aligns with and abuts boss 42B, boss 42A aligns with and abuts boss 44B, and the assembled shells are secured by fasteners 45 which thread through the bosses. The semi-circular slots 35 align to form a circular opening 36 at each end. The edges at the ends of the shells engage to form a medial parting line-type interface. Prior to the previously described ultimate assembly of the shells 30A and 30B, a number of assembly steps are undertaken.

With reference to FIGS. 7-13, the panels 32A and 32B of the shells 30A and 30B function as a cradle for the principal functional components which are pre-assembled and mounted between the shells as described below.

Figure 8:
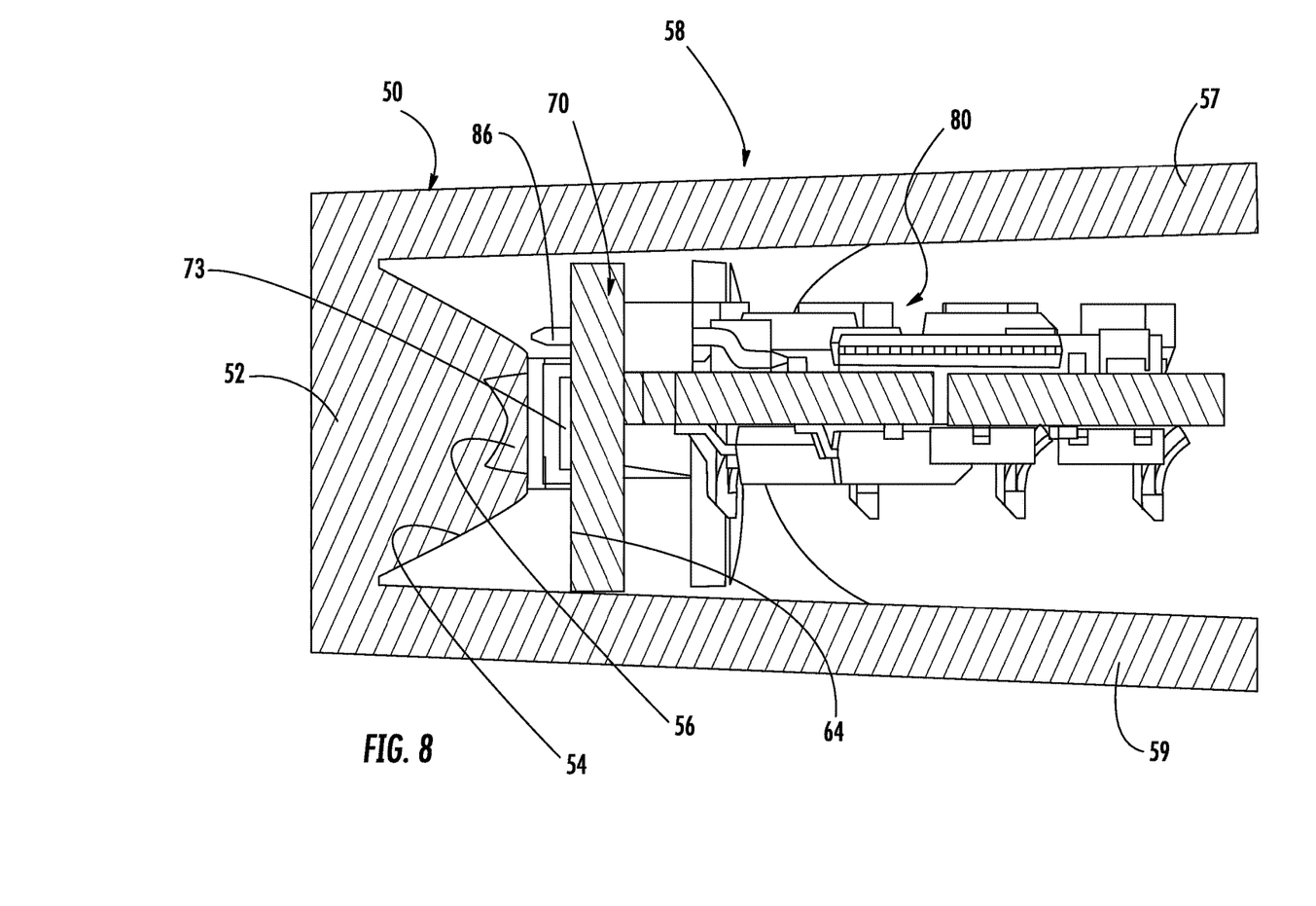
FIG. 8 is an enlarged transverse sectional view of an integrated optical assembly, an LED board and a power board assembly in a pre-assembled state for the modular vehicle light of FIG. 1.

The integrated optical assembly 50 comprises an elongated lens 52 which substantially spans the forward frontal length of the module 20 and is disposed in the window 38. The optical assembly 50 is an integrally molded plastic part that defines a shallow trough for receiving the LED assembly 70 and the power board 80. The closed forward portion of the optical assembly 70 includes an elongated beam forming optic which includes an elongated concave internal reflector 54 which cooperates with a centrally located refractor 56 (FIGS. 7 and 8). The LEDs 73, which may encompass LEDs 74, 76 and 78, are located behind the refractor 56. In a preferred installed orientation of the modular vehicle light 10, the optical components function to provide a vertically collimated, wide-angle horizontal beam which projects forwardly from the front of each module 20.

The integrated optical assembly 50 includes an integral rearward projecting mounting frame 58 having a pair of panels 57 and 59 which are transversely spaced to define a shallow trough. The panels 57 and 59 include opposed slots 62 for receiving potting dams (described below) and locating same in place. The LED board 72 is mounted against an inside surface 64 of the optical assembly 50 and secured by screws 65. The screws 65 thread into staggered anchoring sockets 67 formed in the optical assembly 50. The power board 80 is then disposed between the panels 57 and 59 and is secured against the LED board 72 at a center portion of the module. The power board 80 may be secured to LED board 72 prior to the installation of the LED board. Conductors 26 and connectors 24 may also be attached prior to installation and potting.

The integrated optical assembly 50, with the LED assembly 70, power board 80 installed and potted in the trough defined by the optical assembly 50, is inserted between the housing shell panels 32A, 32B whereby the shells 30A, 30B are secured about the optical assembly 50 so that the lens/frame is essentially positioned and secured within an enclosure defined by the housing shells 30A, 30B. The ends of the panels 34 include openings 36 for accommodating strain relief members, grommets or other seals 39 at the ends of the modules to provide the various connections.

LED board 72 substantially spans the length of the module and is disposed in a generally upright orientation when the module is installed in a generally horizontal position. The LED board 72 includes an array of aligned longitudinally spaced LEDs 73. In one embodiment the LEDs 73 are uniformly spaced. The LEDs 73 may be organized in pods or groups of three different LED emitters, namely red, blue, and white emitters designated respectively as LED groups 74, 76 and 78 (FIG. 2). In one embodiment, the different LED light illuminations are alternately distributed along the LED board. Alternatively, one or two illumination frequencies (colors) may be implemented. For a given vehicle installation, various patterns, light frequencies (light) colors, phases and LED intensity may be selected. Accordingly, the tri-color LED linear matrix provides a capability for a wide variety of illumination patterns.

For each module, the power board 80 is mounted behind the LED board 72 at a central location of the shell. Both the power board 80 and the LED assembly are at least partially potted within the integrated optical assembly 50. An upright potting dam 88 (FIG. 9) inserted into opposed slots 62 is disposed at a longitudinally spaced location adjacent each opposed end of the power board. The dam may include a central grommet 89 for conductors 26 for connecting controller 22 and other modules with the (only one dam 88 is illustrated). Strain relief 39 may be disposed in the openings at the opposed ends of the module to receive and seal the electrical connectors for the modules. It will be appreciated that the modules 20 are serially connected as required. In one embodiment, as many as six modules 20 are connected in series.

Figure 10:
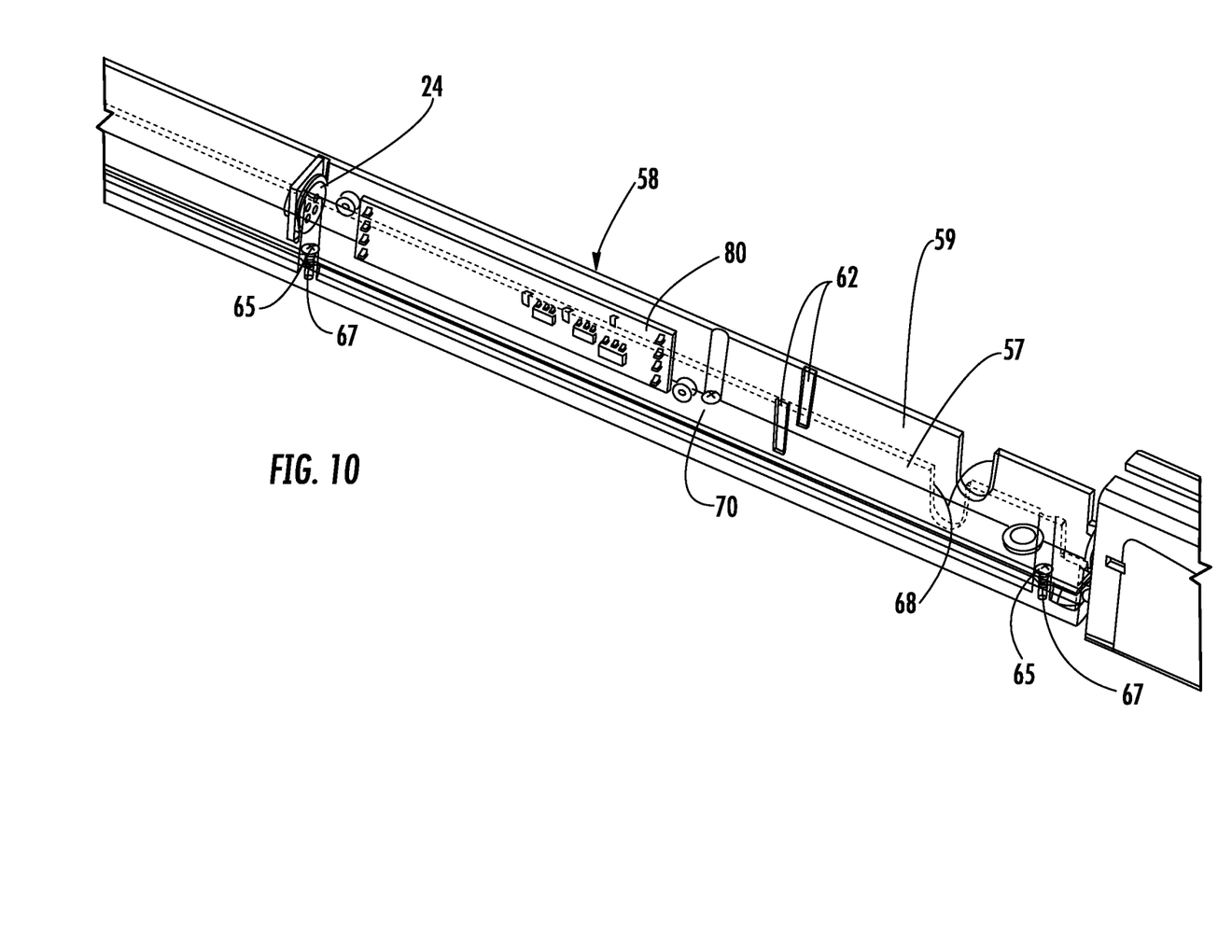
FIG. 10 is an enlarged interior perspective view, partly in phantom and portions removed, of components illustrating an assembly stage for the modular vehicle light of FIG. 1.
Figure 11:
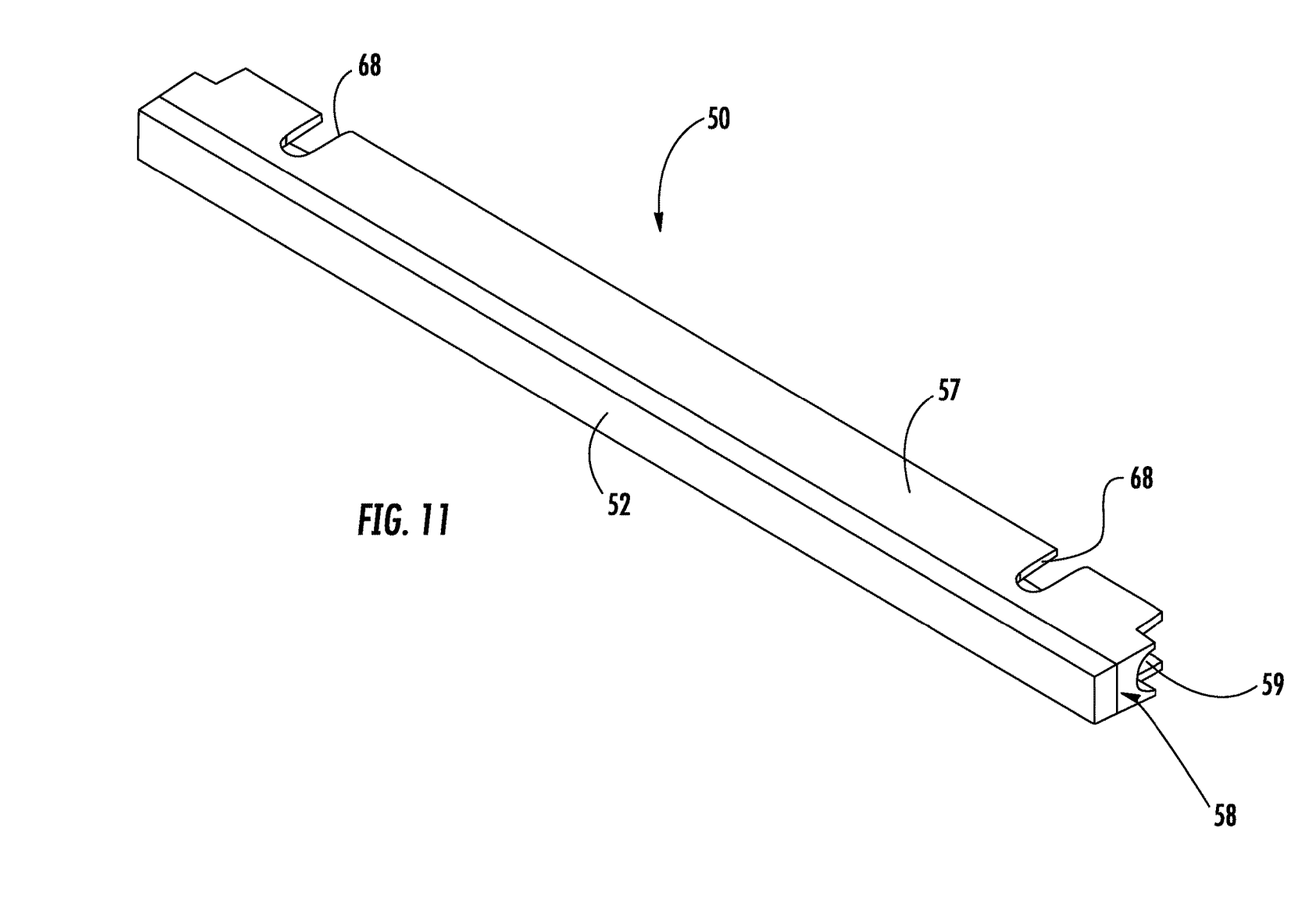
FIG. 11 is a frontal perspective view of an integrated optical assembly for the modular vehicle light of FIG. 1.
Figure 12:
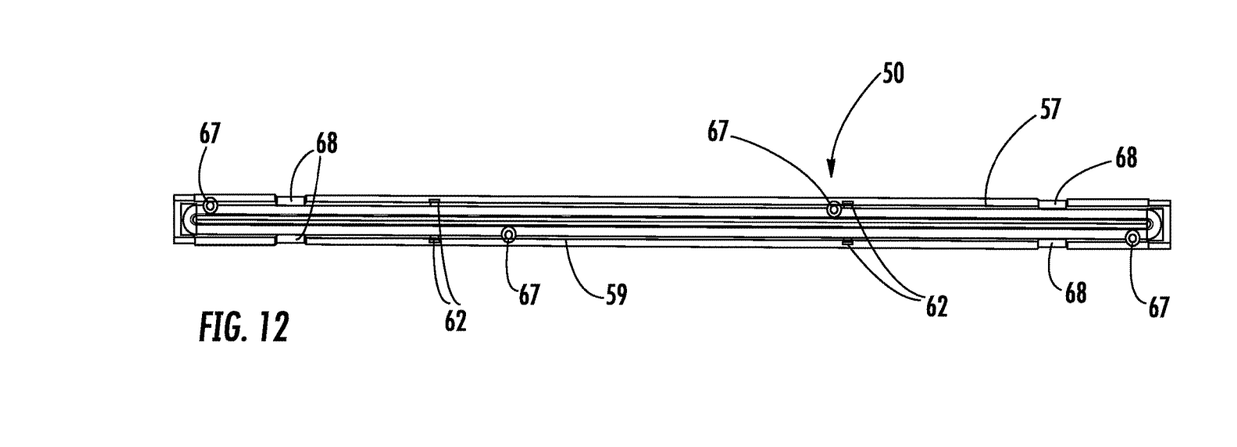
FIG. 12 is a rear view of the integrated optical assembly for the vehicle light module of FIG. 1.

As best illustrated in FIGS. 10 and 11, the optical assembly frame 58 includes opposed enlarged slots 68 at longitudinally spaced locations. The slots terminate slightly above the LED board 72 at a location to form a shallow pan for potting material. Prior to assembly between the opposed shells 30A, 30B, potting material fills between the dams 88 and panels 57 and 59 and covers the connectors and conductors in the pans to provide a two tiered moisture-proof seal of the power board 80 and the various connecting components within the integrated optical assembly 50. The low-level dams or pans at the bottom of the slots 68 provide a thinner level potting along the rear face of LED board 72 so that the electrical lines and connectors are covered.

Figures 14, 15:
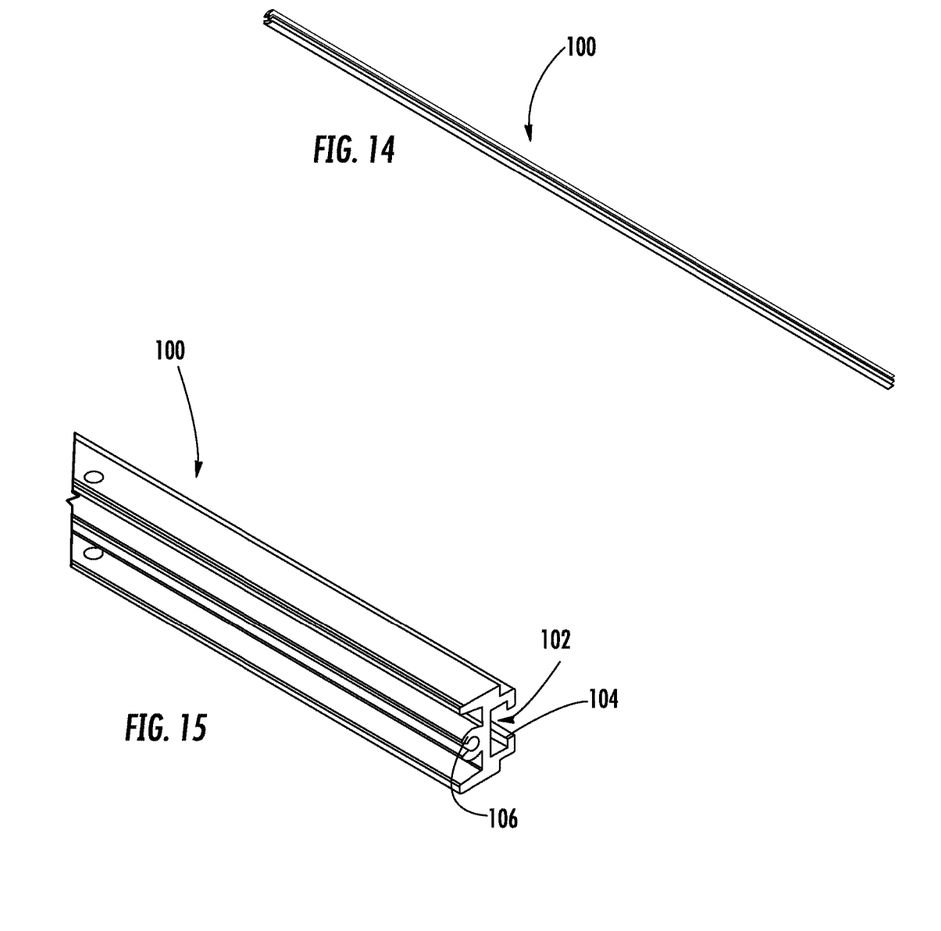
FIG. 14 is a perspective view of connecting/mounting component which is employed in the modular vehicle light of FIG. 1.
FIG. 15 is an enlarged fragmentary perspective view of the component of FIG. 14.

With reference to FIGS. 14 and 15, the bracket 100 has a stepped exterior adapted to be closely received in the channel 48 formed at the rear of each module 20. The connecting bracket 100 is preferably a multi-surfaced extruded aluminum component. The illustrated bracket defines a T-shaped channel 102 with a transverse longitudinal opening 104. The bracket 100 also has an extruded screw boss 106 having a C-shaped section accessible at each longitudinal end of the bracket.

Once it is determined how many modules will be assembled for a given vehicle light, the bracket 100 is cut to length and inserted into the aligned channels 48. Screws 49 through the shells 30A and 30B of each module secure the bracket 100 in position and connect the modules in a ganged end-to-end assembly. In addition, a screw 51 is threaded into the screw boss 106 to secure a cap to the end of the extruded bracket 100.

The channel 102 is configured to receive and capture the heads of fasteners 110 for mounting the light assembly to the vehicle. The undersides of the fastener heads engage the channel walls adjacent the access opening 104. The fastener shanks extend through the opening 104 of the vehicle bracket structure and a mounting structure on the vehicle (not illustrated) and are secured by nuts (not illustrated) or other securing means to mount the modular vehicle light to the vehicle. Multiple fasteners 110 are inserted through one end of the channel and longitudinally spaced as required to ensure a high integrity mount to the vehicle.

It should be appreciated that the foregoing modular vehicle light 10 has an efficient construction which permits a vehicle light to be assembled to a given length by selecting the number of required modules 20, electrically connecting them via the four-pin connectors 24, in end-to-end relationship, and mechanically joining the modules with the bracket 100. The light assembly is mounted to the vehicle via the fasteners 110 which are strategically spaced along the rear mounting slot formed in the bracket. The fasteners are then ultimately bolted to the vehicle. The controller 22 connects to one module end.

While preferred embodiments of the foregoing modular vehicle light have been set forth for purposes of illustration, the foregoing descriptions should not be deemed a limitation of the inventions herein. Accordingly, various modifications, adaptations, and alternatives may incur to one skilled in the art without departing from the spirit and the scope of the present inventions.

The invention claimed is:

1. A vehicle light comprising:
a first shell having longitudinally spaced ends and a second shell substantially identical to said first shell, said first and second shells being joined to define a housing having a front and a rear, said housing defining a longitudinal channel adjacent said rear;
a power board disposed in said housing and electrically connectable through an end;
a matrix of longitudinally spaced LEDs communicating with said power board;
an optical assembly in optical communication with said LEDs to transmit illumination at said front; and
a bracket received in said channel and defining a longitudinal retaining slot accessible at said rear.

2. The vehicle light of claim 1 wherein said ends of said first and second shells define circular openings and a grommet is received in at least one said opening.

3. The vehicle light of claim 1 wherein said optical assembly comprises an elongated concave reflector and a central refractor.

4. The vehicle light of claim 1 wherein said LEDs comprise at least two groups with different emission frequencies.

5. The vehicle light of claim 4 wherein said matrix of LEDs consists of three groups of LEDs, each group having a different emission frequency.

6. The vehicle light of claim 1 wherein said first shell has a pair of anchoring bosses which are alignable with a corresponding boss of said second shell and a fastener connects said bosses to secure together said first and second shell.

7. The vehicle light of claim 1 wherein said bracket defines a T-shaped slot.

8. The vehicle light of claim 1 wherein said power board is centrally located in said housing and is at least partially encased in potting material.

9. The vehicle light of claim 1 comprising a controller remote from said housing which communicates with said power board via a cord through an end of said housing.

10. A modular vehicle light comprising:
a plurality of elongated light modules disposed and connected in a linear end-to-end relationship, each said module comprising:
an elongated housing having a front, a rear, and a pair of opposed ends, said housing defining a longitudinal channel open at both opposed ends of said housing and including a first rearward-facing longitudinal slot;
a power board disposed in said housing and electrically connectable through a said end;
a matrix of longitudinally spaced LEDs communicating with said power board;
an elongated optical assembly in optical communication with said LEDs projects illumination at said front; and
said vehicle light comprising a bracket extending through the longitudinal channel of said plurality of modules, said bracket defining a second rearward-facing longitudinal slot aligned with said first longitudinal slot.

11. The modular vehicle light of claim 10 wherein said optical assembly further comprises an elongated concave reflector, a central refractor and a lens which projects a narrow band of illumination forwardly from said module upon energizing said LEDs.

12. The modular vehicle light of claim 10 wherein said matrix of spaced LEDs comprises at least two groups of LEDs, each group having a different emission frequency.

13. The modular vehicle light of claim 12 wherein there are 36 LEDs in 3 groups, said groups emitting light in the blue, yellow and red frequencies.

14. The modular vehicle light of claim 10 wherein said longitudinal channel is T-shaped and said bracket has a complimentary configuration.

15. A modular vehicle light assembly comprising:

a controller and a plurality of light modules disposed and connected in a linear end-to-end relationship, each said module comprising:

a housing having a front and a rear defining a channel and a pair of opposed ends;

a power board disposed in said housing and having a microprocessor which generates command signals and electrically connectable through a said end for communication with said controller;

a matrix of longitudinally spaced LEDs powered via said power board and responsive to said command signals;

an optical assembly in optical communication with said LEDs to generate a band of illumination at said front;

a bracket received in said channel and connecting each said module; and     a plurality of fasteners extending through said housing to engage said bracket, thereby securing said housing to said bracket in a predetermined longitudinal position on said bracket.

16. The modular vehicle light assembly of claim 15, wherein each said power board is connected in series.

17. The modular vehicle light assembly of claim 15 wherein said controller and said modules connect via a four conductor line.

18. The modular vehicle light assembly of claim 15 wherein said controller and said modules connects via a four-pin connection disposed at a module end.

19. The modular vehicle light assembly of claim 15 wherein each said power board has a buffer which communicates with said controller and said microprocessor.

20. The modular vehicle light assembly of claim 19 wherein data is transmitted from the controller in a serial format in 12 byte packets and each buffer is filled with two-byte segments of data and remaining two-byte segments of data are transmitted to the succeeding modules, wherein each said two-byte segment includes information regarding the flash pattern, color, phase and intensity of the light emitted by the LEDs.

\* \* \* \* \*